United States Patent
Tanabe

(10) Patent No.: US 11,808,933 B2
(45) Date of Patent: Nov. 7, 2023

(54) LIQUID IMMERSION OBJECTIVE, MICROSCOPE, AND OBSERVATION METHOD

(71) Applicant: KYOCERA SOC Corporation, Kanagawa (JP)

(72) Inventor: Takao Tanabe, Kanagawa (JP)

(73) Assignee: KYOCERA SOC Corporation, Kanagawa (JP)

( * ) Notice: Subject to any disclaimer, the term of this patent is extended or adjusted under 35 U.S.C. 154(b) by 385 days.

(21) Appl. No.: 17/189,734

(22) Filed: Mar. 2, 2021

(65) Prior Publication Data

US 2021/0271064 A1   Sep. 2, 2021

(30) Foreign Application Priority Data

Mar. 2, 2020   (JP) .................. 2020-035232

(51) Int. Cl.
*G02B 21/33* (2006.01)
*G02B 21/02* (2006.01)
*G02B 21/16* (2006.01)

(52) U.S. Cl.
CPC ............. *G02B 21/33* (2013.01); *G02B 21/02* (2013.01); *G02B 21/16* (2013.01)

(58) Field of Classification Search
CPC ........ G02B 21/33; G02B 21/02; G02B 21/16; G02B 21/00; G02B 21/0004; G02B 21/002; G02B 21/0032; G02B 21/0052; G02B 21/006; G02B 21/06; G02B 21/34; G02B 21/36; G02B 21/361; G02B 27/0025
USPC ....... 359/396, 362, 363, 368, 369, 381, 385, 359/388, 398
See application file for complete search history.

(56) References Cited

U.S. PATENT DOCUMENTS

| 5,708,531 A * | 1/1998 | Yamada ................. G02B 21/02 359/660 |
| 2015/0109681 A1 | 4/2015 | Konishi et al. |
| 2015/0109682 A1 | 4/2015 | Kasahara et al. |
| 2017/0261736 A1 | 9/2017 | Abe |

FOREIGN PATENT DOCUMENTS

| JP | 2008111981 | 5/2008 | |
| WO | WO-2005001544 A1 * | 1/2005 | ......... G03F 7/70341 |
| WO | WO 2009/096522 | 5/2011 | |

OTHER PUBLICATIONS

Japanese Office Action for corresponding Application No. JP 2020-035232, dated Mar. 30, 2021—3 pages.
"Panoramic View of the Life Science and Clinical Research Field (2019)", Center for Research and Development Strategy, Japan Science and Technology Agency.
"The Light-sheet Microscopy Revolution", J. Opt. 20, (2018) 053002 (20 pp) J. M. Girkin and M. T. Carvalho.

* cited by examiner

*Primary Examiner* — Arnel C Lavarias
(74) *Attorney, Agent, or Firm* — Dority & Manning, PA

(57) ABSTRACT

Provided is a liquid immersion objective including an objective lens having a prescribed optical power, and a plurality of planar plates having substantially no optical power and having different thicknesses, and configured to be placed between the objective lens and immersion liquid deposited on a sample to be observed, the planar plates being made of a substantially same material, wherein the planar plates being selected according to a property of the immersion liquid.

5 Claims, 20 Drawing Sheets

LIQUID IMMERSION OBJECTIVE, MICROSCOPE, AND OBSERVATION METHOD

TECHNICAL FIELD

The present invention relates to a liquid immersion objective, a microscope using such a liquid immersion objective and an observation method using such a microscope which are suitable for use in conjunction with fluorescent microscopes and lightsheet microscopes.

BACKGROUND ART

Fluorescence microscopy and lightsheet microscopy are known as a tool for obtaining three-dimensional information of biological samples. See J. M. Girkin and M. T. Carvalho, "The Light-sheet Microscopy Revolution", J. Opt. 20, (2018) 053002 (20 pp), for instance.

In such microscopy, typically, fluorescence image information of a biological sample is obtained only from the region irradiated by the illumination light (excitation light) in sheet form or the lightsheet, and the lightsheet is scanned over the targeted region of the sample to acquire the desired three-dimensional information. Therefore, the range in which the three-dimensional information can be acquired is limited by the distance from the objective or the condenser to the sample surface or the working distance (WD).

Conventionally, owing to the limited transparency of the samples even with the use of transparency enhancing agents, the applications of fluorescence microscopy and light-sheet microscopy were limited to relatively small samples. Therefore, the commercially available liquid immersion objects and condensers having relatively small working distances were considered as adequate.

However, owing to the advancement of transparency enhancement technology for biological tissues, there have been attempts to obtain three-dimensional information from larger biological tissues such as organs. See "Panoramic View of the Life Science and Clinical Research Field (2019)", Center for Research and Development Strategy, Japan Science and Technology Agency, for instance. In view of such needs, various proposals have been made as structures for liquid immersed objects having increased working distances based on the existing structures of fluorescent microscopes. See JP2015-79144A, JP2015-79222A and JP6552436B2, for instance.

In observing biological samples by using a liquid immersed objective, the immersion liquid placed between the objective and the sample is selected from a plurality of choices depending on the sample and the nature of the observation. More specifically, due to the differences in the dispersion of the different immersion liquids (or the differences in the Abbe numbers of the different immersion liquids), and the resulting changes in the chromatic aberration, the resolution power of the microscope may be impaired. This creates the need to compensate for the differences in the dispersion from one immersion liquid to another. This is a particularly acute problem when a large numerical aperture and a large working distance are both required.

The objective of a biological microscope having a high numerical aperture is typically provided with a correction ring in order to compensate for the aberration changes due to fluctuations in the thickness of the cover glass (see JP2008-111981A, for instance). By turning the correction ring, a part of the correction lens group is moved along the optical axal line so that the changes in the spherical aberration due to the fluctuations in the thickness of the cover glass and the changes in the observation depth of the sample can be compensated for. JP2015-79144A, JP2015-79222A and JP6552463B disclose techniques for canceling the changes in the spherical aberration due to the changes in the refractive index of the immersion liquid by moving a part of the lens group.

According to the method of moving a part of the lens group by using the correction ring, the spherical aberration can be corrected, but the chromatic aberration, which is one of the paraxial amounts of the optical system, cannot be changed to any significant extent. Therefore, when this method is applied to a liquid immersion objective as it is, it is not possible to ensure a long working distance and to properly correct the chromatic aberration for various immersion liquids at the same time.

SUMMARY OF THE INVENTION

In view of such a problem of the prior art, a primary object of the present invention is to provide a liquid immersion objective that allows the chromatic aberration to be corrected for each different immersion liquid, and can be adapted to a wide range of different immersion liquids. Another object of the present invention is to provide a microscope using such a liquid immersion objective and an observation method using such a microscope.

To achieve such an object, the present invention provides a liquid immersion objective (1), comprising: an objective lens (3) having a prescribed optical power; and a plurality of planar plates (5) having substantially no optical power and having different thicknesses, and configured to be placed between the objective lens and immersion liquid (2) deposited on a sample (S) to be observed, the planar plates being made of a substantially same material, wherein the planar plates being selected according to a property of the immersion liquid.

By changing the total thickness of the planar plate or the planar plates arranged between the objective lens and the immersion liquid by suitable selection of the planar plate or the planar plates, the chromatic aberration can be corrected for each different immersion liquid having a particular refractive index.

To achieve such an object, the present invention further provides a microscope (10), comprising: the liquid immersion objective (1) as defined earlier; and an imaging lens (14) that converges a light flux transmitted from the liquid immersion objective, wherein the planar plates are configured to be selectively placed between the liquid immersion and the objective lens according to an Abbe number (v) of the immersion liquid, the Abbe number being a material specific value given by the following equation $$v = \frac{n_0 - 1}{n_S - n_L} \quad (1)$$

where $n_0$ is the refractive index of the planar plates at a mid point wavelength in a correction range of chromatic aberration, and $n_S$ and $n_L$ are refractive indexes of the planar plates on a short wavelength side and on a long wavelength side, respectively.

Typically, in the definition of the Abbe number, $n_0$ is the refractive index for the d line (λ=587.56 nm), $n_s$ is the refractive index for the F line (λ=486.13 nm), and $n_L$ is the refractive index for the C line (λ=656.27 nm). However, the Abbe number may be defined by using the refractive indexes of other wavelengthes including those in the near-infrared region or the near-ultraviolet region, depending on the application of the optical system.

By suitably selecting the planar plates placed between the objective lens and the immersion liquid according to the Abbe number of each particular immersion liquid, the chromatic aberration can be properly corrected so that the sample can be observed in a clear and accurate manner.

To achieve such an object, the present invention further provides a method for observing a sample by using the microscope defined above, comprising the steps of selecting at least one of the planar plates according to the Abbe number of the immersion liquid, and placing the selected at least one of the planar plates between the objective lens and the immersion liquid.

By suitably selecting the planar plates placed between the objective lens and the immersion liquid according to the Abbe number of each particular immersion liquid, the chromatic aberration can be properly corrected so that the sample can be observed in a clear and accurate manner.

Preferably, the planar plates have an Abbe number $v_1$ which is smaller than an Abbe number $v_2$ of the immersion liquid, and when the thickness $t_a$ of the planar plates is selected for the immersion liquid with an Abbe number $v_{2a}$, the thickness $t_b$ of the planar plates is selected for the immersion liquid with an Abbe number $v_{2b}$, and $v_{2a} \leq v_{2b}$, then $t_a \leq t_b$.

The chromatic aberration can be thereby properly corrected by the planar plates interposed between the objective lens and the immersion liquid according to the Abbe number of the immersion liquid so that the sample can be observed in a clear and accurate manner.

Preferably, the planar plates have an Abbe number $v_1$ which is greater than an Abbe number $v_2$ of the immersion liquid, and when the thickness $t_a$ of the planar plates is selected for the immersion liquid with an Abbe number $v_{2a}$, the thickness $t_b$ of the planar plates is selected for the immersion liquid with an Abbe number $v_{2b}$, and $v_{2a} \geq v_{2b}$, then $t_a \geq t_b$.

The chromatic aberration can be thereby properly corrected by the planar plates interposed between the objective lens and the immersion liquid according to the Abbe number of the immersion liquid so that the sample can be observed in a clear and accurate manner.

The present invention thus provides a liquid immersion objective that allows the chromatic aberration to be corrected for each different immersion liquid, and can be adapted to a wide range of different immersion liquids. The present invention further provides a microscope using such a liquid immersion objective, and an observation method using such a microscope.

BRIEF DESCRIPTION OF THE DRAWING(S)

DESCRIPTION OF THE PREFERRED EMBODIMENT(S)

An immersion objective 1 according to the present invention is described in the following with reference to the appended drawings.

Figure 3:
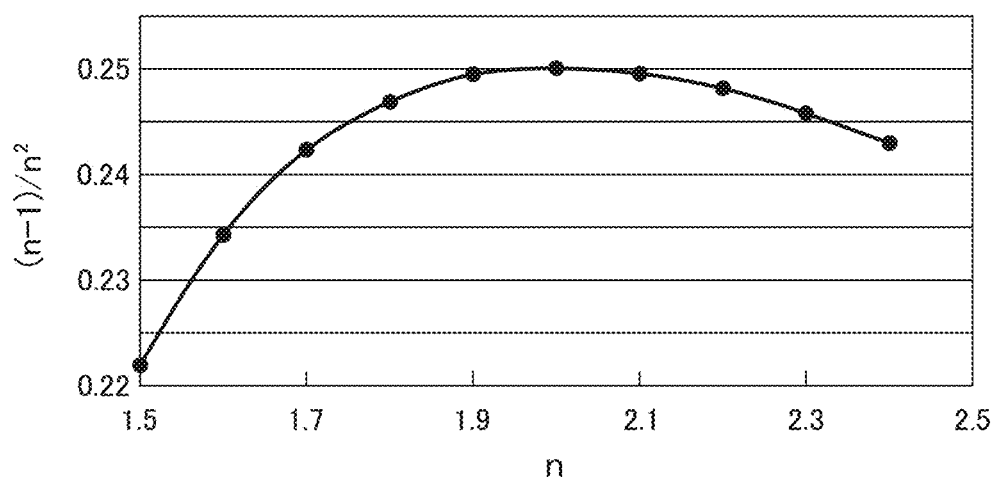
FIG. 3 is a graph showing the relationship of a coefficient $(n-1)/n^2$ to a refractive index n.
Figure 4:
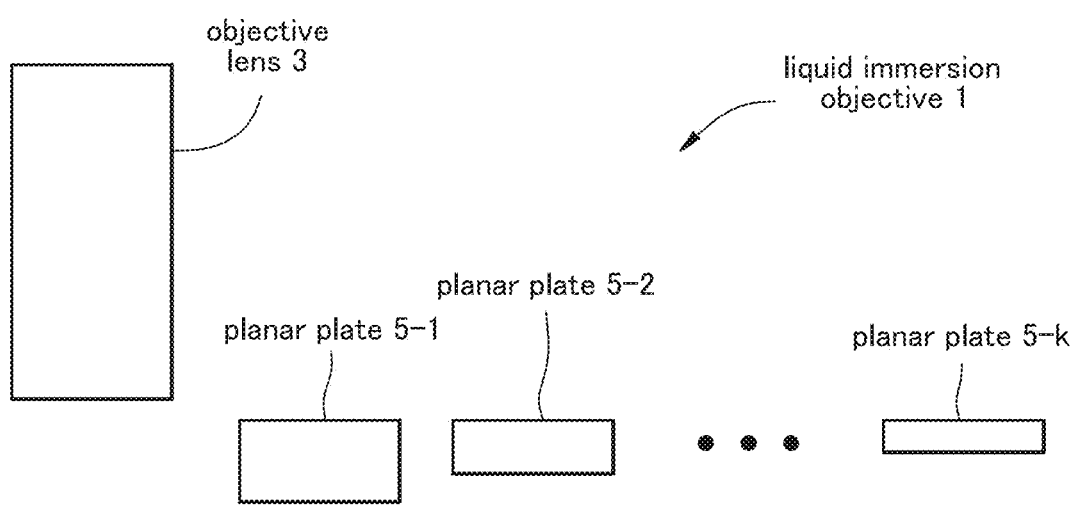
FIG. 4 is a diagram showing the structure of a liquid immersion objective according to the present invention.

The present invention prevents the occurrence of chromatic aberration for a plurality of types of immersion liquid 2 in a microscope using an immersion objective 1 (see FIGS. 3 and 4). The immersion objective 1 includes an objective lens 3 arranged so as to face the sample S, and the immersion liquid 2 is placed on the side of the sample S facing the objective lens 3. The objective lens 3 has a positive refractive power, and may be composed of a simple lens (a single lens or a bonded lens) or may be composed of a plurality of lenses (compound lens). Further, the liquid immersion objective 1 includes a plurality of planar plates 5 having substantially no refractive power and having different thicknesses. Each planar plate 5 has a prescribed thickness, and has a pair of planar surfaces which are parallel to each other. These planar plates 5 are typically made of a same type of glass. Chromatic aberration is corrected for each different immersion liquid 2 by inserting the planar plates 5 or the planar plate 5, selected according to the Abbe number ($v_2$) of the immersion liquid 2, between the objective lens 3 and the immersion liquid 2 so as to be in contact with the immersion liquid 2.

The method of selecting the planar plates 5, and the theoretical basis for the selection are discussed in the following.

Figure 1:
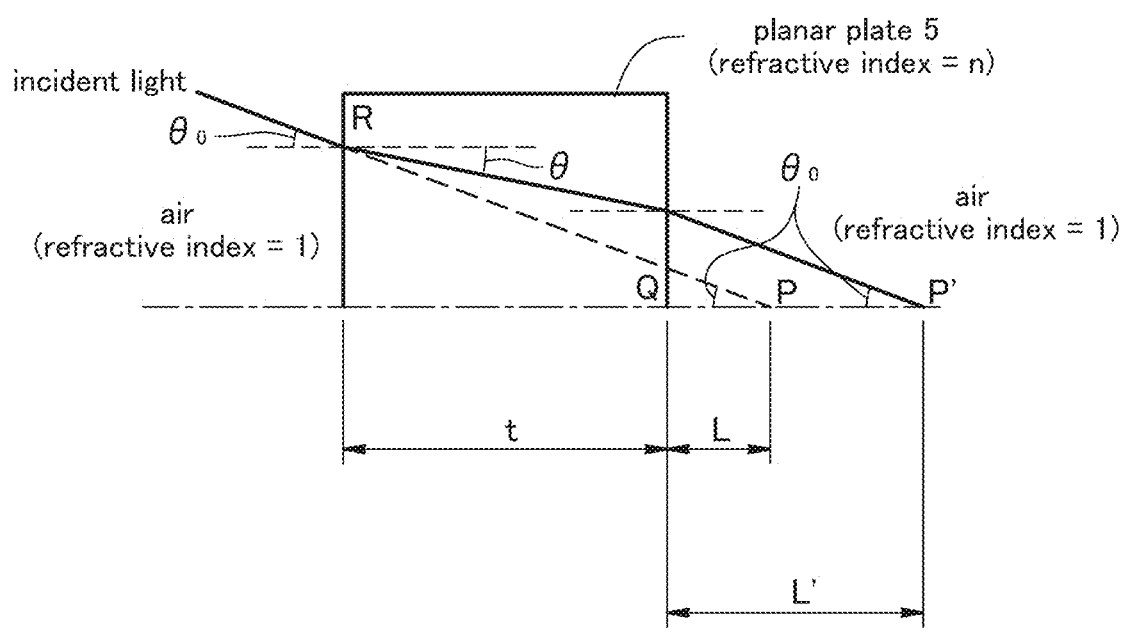
FIG. 1 is a diagram showing the path of a light beam incident on a planar plate placed in the air.

Suppose that a light ray is incident on a planar plate 5 having a thickness oft and a refractive index of n placed in the air at an incident angle $\theta_0$ with respect to the optical axis as shown in FIG. 1. According to Snell's law, the relationship of Equation (2) given in the following holds between the incident angle $\theta_0$ and the refraction angle $\theta$.

$$\sin \theta_0 = n \cdot \sin \theta \qquad (2)$$

Since the heights of the incident light ray and the refracted light ray are equal to each other at the incident point R of the light rays on the incident surface of the planar plate 5 as shown in in FIG. 1, the relationship represented by Equation (3) given in the following holds between L and L' and the thickness t of the planar plate 5.

$$(L+t) \tan \theta_0 = L' \tan \theta_0 + t \tan \theta \qquad (3)$$

By paraxial approximation ($\sin \theta \approx \theta$, $\tan \theta \approx \theta$), the change in the image point positions (L'−L) due to the presence of the planar plate 5 can be obtained from Equations (2) and (3) can be represented by Equation (4) given in the following.

$$L'-L = (1 - 1/n) \cdot t \qquad (4)$$

Since the refractive index (n) of the planar plate 5 varies depending on the wavelength, the change in the image plane position depending on the presence or absence of the planar plate 5 also differs depending on the wavelength. Thus, the difference in L'−L due to the wavelength corresponds to the chromatic aberration due to the planar plate 5 that functions as the correction plate.

From the foregoing, the chromatic aberration ($\Delta L$) due to the planar plate 5 is given by Equation (5) given in the following.

$$\Delta L = \Delta(L' - L) = \Delta\left(1 - \frac{1}{n}\right)t = -\Delta\left(\frac{1}{n}\right)t \qquad (5)$$

The difference $\Delta$ means the difference between the short side and the long side of the target wavelength range, and $\Delta(1/n)$ is specifically given by Equation (6) given in the following.

$$\Delta\left(\frac{1}{n}\right) = \frac{1}{n_S} - \frac{1}{n_L} \qquad (6)$$

where $n_S$ and $n_L$ are the refractive indexes of the planar plate 5 on the short wavelength side and the refractive index on the long wavelength side, respectively.

Generally, the chromatic aberration created by the planar plate 5 consisting of a plurality of media M can be obtained by adding the chromatic aberration for each medium M given by Equation (5). More specifically, the chromatic aberration created by the entire planar plates 5 is given by Equation (7) given in the following.

$$\Delta L = -\sum_{j=1}^{k} \Delta\left(\frac{1}{n_j}\right) t_j \qquad (7)$$

Figure 2:
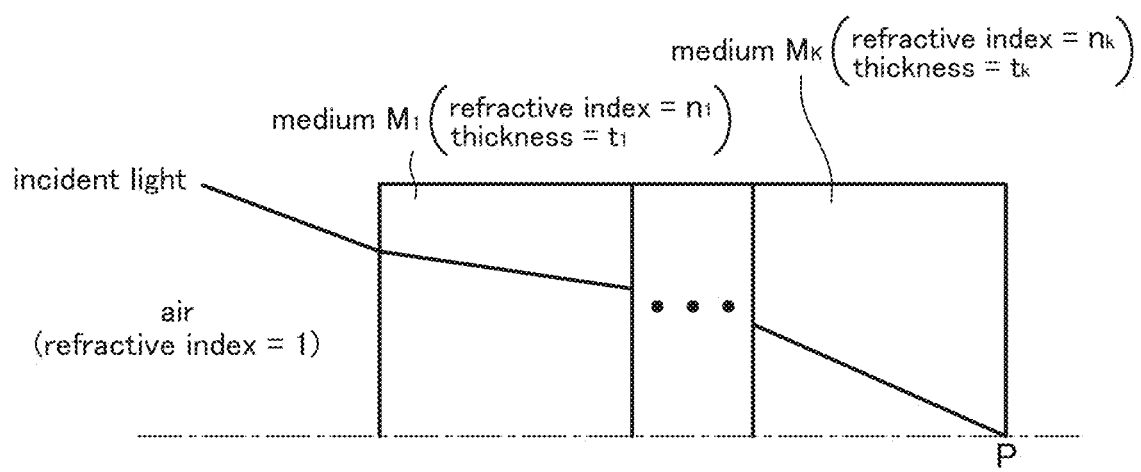
FIG. 2 is a diagram showing the path of a light beam successively incident on a plurality of planar plates.

Equation (7) is a general formula. Here, consider a system consisting of a planar plate 5 and an immersion liquid 2 (a case of k=2 in FIG. 2), and suppose that the medium $M_1$ corresponds to the planar plate 5, and the medium $M_2$ corresponds to the immersion liquid 2. In order to obtain a general formula that covers a plurality of kinds of immersion liquid 2, suppose an immersion liquid 2 (medium $M_0$) having a refractive index no and a thickness L that causes the thickness of the correction plate to be virtually zero.

It is preferable for practical purposes that the sum of the thicknesses of the planar plate 5 and the immersion liquid 2 is substantially constant without regard to the property of the immersion liquid 2. In other words, it is preferable that the distance between the surface of the immersion objective 1 closest to the sample surface and the sample surface is constant.

Based on this assumption, in order for the condition holds that the chromatic aberration with respect to the medium $M_0$ does not change with respect to the medium $M_2$ and the sum of the lengths of the planar plate 5 made of the medium $M_1$ and the immersion liquid 2 made of the medium $M_2$ is constant, the thickness of the medium $M_1$ (or the thickness of the planar plate 5) and the thickness of the medium $M_2$ (or the thickness of the immersion liquid 2) are determined by the following simultaneous equations given as Equation (8). Here, $t_1$ is the thickness of the medium $M_1$, and $t_2$ is the thickness of the medium $M_2$.

$$\begin{cases} t_1 + t_2 = L \\ \Delta\left(\frac{1}{n_1}\right)t_1 + \Delta\left(\frac{1}{n_2}\right)t_2 = \Delta\left(\frac{1}{n_0}\right)L \end{cases} \qquad (8)$$

If $a = \Delta(1/n_1)$, $b = \Delta(1/n_2)$, and $c = \Delta(1/n_0)$, Equation (8) can be represented by the first order equation given in the following as Equation (9).

$$\begin{pmatrix} 1 & 1 \\ a & b \end{pmatrix}\begin{pmatrix} t_1 \\ t_2 \end{pmatrix} = \begin{pmatrix} 1 \\ c \end{pmatrix}L \qquad (9)$$

The solution to this first order equation is given by Equation (10) given in the following.

$$\begin{pmatrix} t_1 \\ t_2 \end{pmatrix} = \frac{1}{b-a}\begin{pmatrix} b & -1 \\ -a & 1 \end{pmatrix}\begin{pmatrix} 1 \\ c \end{pmatrix}L = \begin{pmatrix} \frac{b-c}{b-a} \\ \frac{c-a}{b-a} \end{pmatrix}L \qquad (10)$$

For the thicknesses of the medium $M_1$ (planar plate 5) and the medium $M_2$ (immersion liquid 2) to be positive in value, the relationship between $a = \Delta(1/n_1)$, $b = \Delta(1/n_2)$, and $c = \Delta(1/n_0)$ represented by Equation (11) given below is require to hold.

$b-a<0$, and $b-c<0$, and $c-a<0$(condition 1)

$b-a>0$, and $b-c>0$, and $c-a>0$(condition 2)   (11)

By rearranging the inequalities of condition 1 and condition 2, Equation (11) can be rewritten as represented by Equation (12) given in the following.

$b<c<a$(condition 1), and $b>c>a$(condition 2)   (12)

Here, $a = \Delta(1/n_1)$, $b = \Delta(1/n_2)$, and $c = \Delta(1/n_0)$ can be expressed by using the Abbe number. By noting that the following relationship holds by definition $$\Delta\left(\frac{1}{n}\right) = \frac{1}{n_S} - \frac{1}{n_L} = -\frac{n_S - n_L}{n_S n_L} \approx -\frac{n_S - n_L}{n_0^2} \qquad (13)$$

and $N_S - n_L = (n_0 - 1)/\nu$ from the definition of the Abbe number or Equation (1), $\Delta(1/n)$ can be expressed by Equation (14) given in the following.

$$\Delta\left(\frac{1}{n}\right) \approx -\frac{n_S - n_L}{n_0^2} = -\frac{n_0 - 1}{n_0^2 V} \quad (14)$$

According to FIG. 3, since the coefficient $(n_0-1)/n_0^2$ takes a value of 0.22 to 0.25 substantially without regard to the value of n, $\Delta(1/n)$ is substantially inversely proportional to the Abbe number. Based on this fact, Equation (12) is approximately equivalent to the following conditions by using the Abbe number ($v_0$) of the medium $M_0$, the Abbe number ($v_1$) of the medium $M_1$, and the Abbe number ($v_2$) of the medium $M_2$.

$$v_2 > v_0 > v_1 \text{(condition 1), or } v_2 < v_0 < v_1 \text{(condition 2)} \quad (14)$$

The relevant relationships under condition 1 in Equation (15) are specifically examined in the following.

Under this condition, since the Abbe number ($v_1$) of the planar plate 5 is smaller than the Abbe number ($v_2$) of any of the applicable immersion liquids 2, and b=c with respect to the immersion liquid 2 with the Abbe number $v_0$, the solution for the planar plate 5 given by Equation (10) becomes zero. Further, since the thickness of the planar plate 5 is inversely proportional to (b–a) in Equation (10), the larger the difference in the Abbe number between the planar plate 5 and the immersion liquid 2 is, the thicker the planar plate 5 becomes. In other words, the thickness (t) of the planar plate 5 required for correcting the chromatic aberration becomes greater for the immersion liquid 2 having a larger Abbe number.

In the case of condition 2 of Equation (15) which is reversed in relationship as compared with the case discussed above, the Abbe number ($v_1$) of the planar plate 5 is larger than the Abbe number (v2) of any of the applicable immersion liquids 2, and the thickness (t) of the planar plate 5 required for correcting the chromatic aberration becomes thicker for the immersion liquid 2 having a smaller Abbe number.

Some numerical examples are given below for condition 1 of Equation (15).

TABLE 1

|  | medium $M_0$ | medium $M_2$ | medium $M_2$' | medium $M_1$ |
|---|---|---|---|---|
| refractive index | 1.5611 | 1.5200 | 1.4770 | 1.9229 |
| Abbe number | 29.2011 | 32.7000 | 39.3477 | 18.1900 |
| $\Delta$ n | 0.0192 | 0.0159 | 0.0121 | 0.0507 |
| $\Delta$ (1/n) | −0.0079 | −0.0069 | −0.0056 | −0.0137 |

In Table 1, the characteristics of the medium $M_1$ represent those of the planar plate 5, and the medium $M_2$ and the medium $M_2$' represent the characteristics of the immersion liquid 2. $\Delta(1/n)$ is a value obtained by substituting the Abbe number and the refractive index of the substance of the medium into Equation (14). The medium $M_1$ representing the planar plate 5 corresponds to S-NPH2, which is a heavy flint optical glass manufactured by OHARA Corporation located in Sagamihara-shi, Kanagawa, Japan.

When the sum of the thicknesses of the system consisting of the planar plate 5 and the immersion liquid 2 is L=35 mm, and the medium $M_0$ in which the thickness of the planar plate 5 becomes zero is selected as the medium $M_2$ and the medium $M_2$', the solution to Equation (10) is as given in the following.

TABLE 2

|  | medium $M_2$ | medium $M_2$' |
|---|---|---|
| t1 | 5.125974 | 9.977243 |
| t2 | 29.87403 | 25.02276 |

Here, the thickness ($t_1$) of the medium $M_1$ corresponds to the thickness (t) of the planar plate 5, and the thickness ($t_2$) of the medium $M_2$ and the medium $M_2$' corresponds to the thickness (t') of the immersion liquid 2.

As shown in Table 2, for the medium $M_2$ and the medium $M_2$', the thicknesses (t) of the planar plate 5 are given as about 5.12 mm and 9.97 mm, respectively, and the working distances, or the thicknesses (t') of the immersion liquid 2 are given as about 29.87 mm and 25.02 mm, respectively, which are considered to be practical.

Further, by inserting the planar plate 5 between the objective lens 3 and the immersion liquid 2, the planar plate 5 can also serve as a so-called protective glazing which can be expected to reduce the possibility of damages to the objective lens (lens surface, cylinder, lens adhesive, etc.) which the immersion liquid 2 may cause.

According to the present invention, the immersion objective 1 having a long working distance and a large numerical aperture, and capable of correcting chromatic aberration corresponding to the refractive indexes of various immersion liquids 2 is formed without requiring a mechanism for driving the lens.

FIG. 4 shows a schematic diagram of the immersion objective 1 according to the present embodiment. As shown in FIG. 4, the immersion objective 1 includes an objective lens 3 having a certain refractive power, and a plurality of interchangeable planar plates 5 (5-1, 5-2, . . . , 5-k) made of a same glass type, having no refractive power, and having different thicknesses.

Figures 5A, 5B:
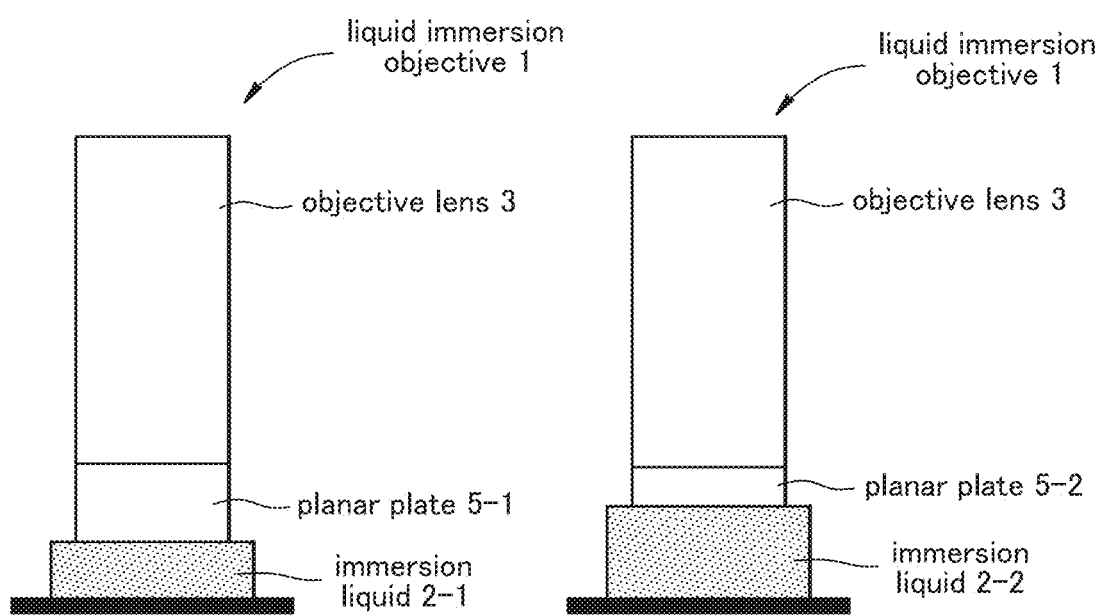
FIG. 5A is a diagram showing a mode of using the liquid immersion objective.
FIG. 5B is a diagram showing another mode of using the liquid immersion objective.

FIG. 5 illustrates a mode of use of the immersion objective 1 according to the present embodiment. When using the immersion objective 1, a set of planar plates 5 having a thickness corresponding to each selected immersion liquid 2 is positioned between the objective lens 3 and the immersion liquid 2 so as to be in contact with the immersion liquid 2. When a different immersion liquid is used, the thickness of the planar plates 5 is changed in a corresponding manner.

First Embodiment

Figure 6:
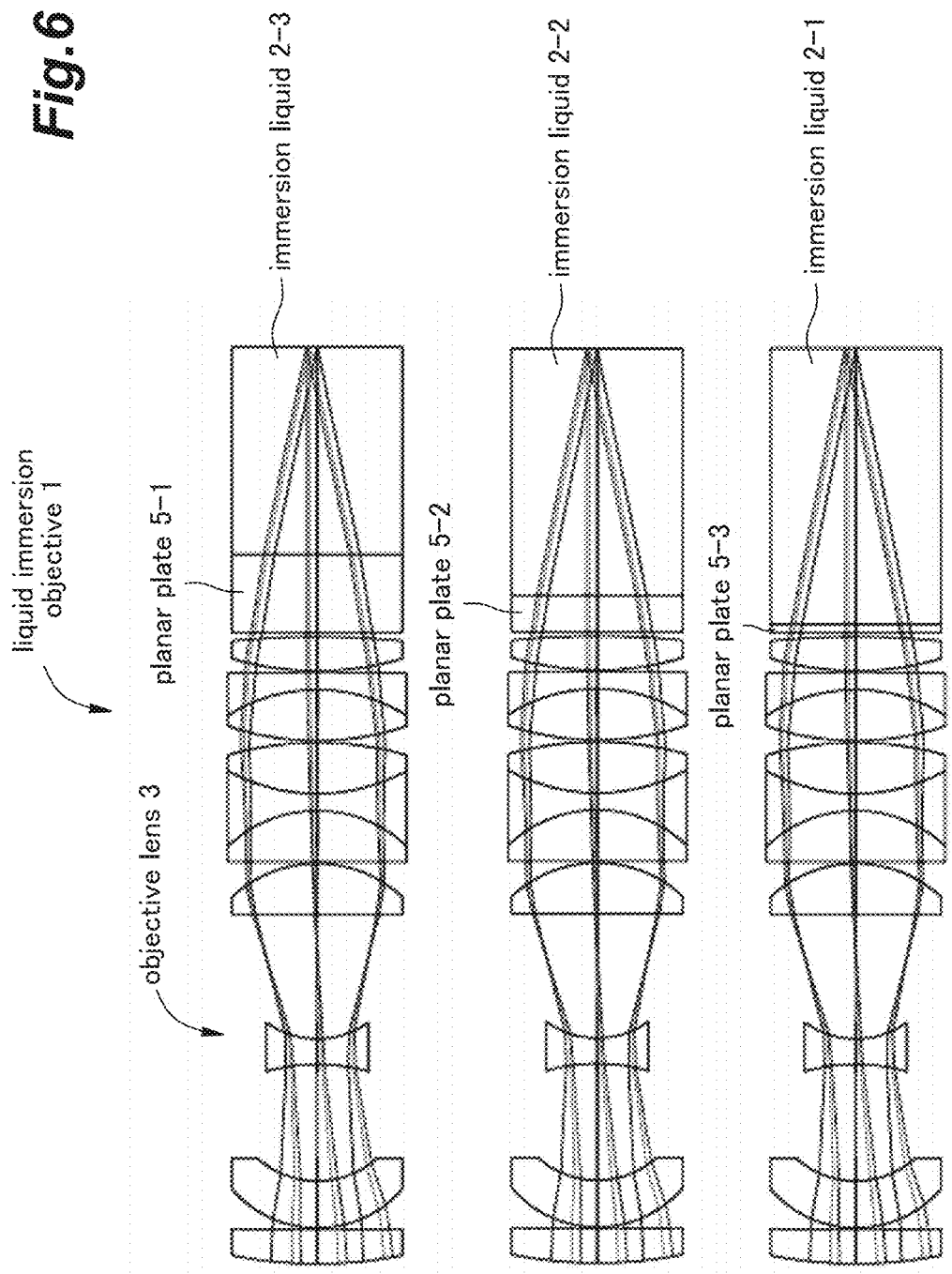
FIG. 6 is a diagram showing three different patterns of the light path in a microscope corresponding to immersion liquids 2-1, 2-2 and 2-3, respectively, according to a first embodiment of the present invention.

In the first embodiment, an immersion objective 1 has a focal length of 18 mm (f=18 mm, a numerical aperture of 0.3 (NA=0.3), a field of view of 205 mm ($\phi$=2.5 mm). Further, the planar plates have an Abbe number $v_1$ which is smaller than an Abbe number $v_2$ of each selected immersion liquid, and when the thickness $t_a$ of the planar plates is selected for the immersion liquid with an Abbe number $v_{2a}$, the thickness $t_b$ of the planar plates is selected for the immersion liquid with an Abbe number $v_{2b}$, and $v_{2a} \leq v_{2b}$, then $t_a \leq t_b$. The lens data is shown in Table 3, and the optical path diagram is shown in FIG. 6. S-TIM2, S-FPL55, S-FPL51, S-BSL7 and S-BSM25 in Table 3 are the names of the employed glasses as named by OHARA Corporation.

TABLE 3

| surface number | radius of curvature [mm] | spacing [mm] | material | refractive index $n_d$ | Abbe number $v_d$ |
|---|---|---|---|---|---|
| 0 | Infinity | Infinity | air |  |  |
| 1 | Infinity | 50.632071 | air |  |  |
| 2 | Infinity | −50.632071 | air |  |  |

TABLE 3-continued

| surface number | radius of curvature [mm] | spacing [mm] | material | refractive index $n_d$ | Abbe number $v_d$ |
|---|---|---|---|---|---|
| 3 | 51.674841 | 4.000000 | S-TIM2 | 1.62004 | 36.26 |
| 4 | 487.851219 | 0.200000 | air | | |
| 5 | 13.249922 | 5.500000 | S-FPL55 | 1.43875 | 94.66 |
| 6 | 10.444724 | 13.702075 | air | | |
| 7 | −21.397265 | 3.000000 | S-FPL51 | 1.49700 | 81.54 |
| 8 | 10.353091 | 14.556918 | air | | |
| 9 | Infinity | 6.000000 | S-FPL55 | 1.43875 | 94.66 |
| 10 | −14.652343 | 0.200000 | air | | |
| 11 | Infinity | 6.000000 | S-FPL55 | 1.43875 | 94.66 |
| 12 | −15.289491 | 2.000000 | S-BSL7 | 1.51633 | 64.14 |
| 13 | 21.774961 | 6.000000 | S-FPL55 | 1.43875 | 94.66 |
| 14 | −38.002712 | 0.200000 | air | | |
| 15 | 32.603371 | 6.000000 | S-FPL55 | 1.43875 | 94.66 |
| 16 | −19.590348 | 2.000000 | S-BSL7 | 1.51633 | 64.14 |
| 17 | −1035.779787 | 0.200000 | air | | |
| 18 | 35.080215 | 4.000000 | S-BSM25 | 1.65844 | 50.88 |
| 19 | −102.691843 | 0.500000 | air | | |
| 20 | Infinity | * | S-NPH2 (planar plate) | 1.92286 | 18.90 |
| 21 | Infinity | * | medium $M_2$ | * | * |
| 22 | Infinity | 0.000000 | | | |

Here, surfaces 20 and 21 correspond to the planar plate 5 and the immersion liquid 2. Table 4 show the data on surfaces 20 and 21 when the medium $M_2$ consists of immersion liquids 2-1, 2-1, and 2-2.

TABLE 4

| | immersion liquid 2-1 | immersion liquid 2-2 | immersion liquid 2-3 |
|---|---|---|---|
| thickness of planar plate(t1) [mm] (surface 20) | 0.957593 | 4.294315 | 9.178845 |
| refractive index of medium $M_2$ | 1.560000 | 1.520000 | 1.477000 |
| Abbe number of medium $M_2$ ($v_2$) | 30.727640 | 32.700000 | 39.347657 |
| thickness of medium $M_2$ ($t_2 = t'$) [mm] (surface 21) | 32.399986 | 28.925643 | 24.355117 |
| $t_1 + t_2$ (=t + t') [mm] | 33.357580 | 33.219958 | 33.533962 |

Here, the material of the planar plate 5 is S-NPH2 which has the refractive index of 1.92286 with respect to the d-line, and the Abbe number of 18.9 which is smaller than that of any of the immersion liquids 2-1, 2-2, and 2-3 selected as the medium $M_2$. As demonstrated in Table 4, the thickness of the planar plate 5 gets thicker as the Abbe number of the immersion liquid 2 increases. In other words, the Abbe number of the planar plate 5 is smaller than the Abbe number of the immersion liquid 2. Moreover, when the thickness of the planar plate 5 selected for the immersion liquid 2 having the Abbe number of $v_{2a}$ is $t_a$, the thickness of the planar plate 5 selected for the immersion liquid 2 having the Abbe number of $v_{2b}$ is $t_b$, and $v_{2a} \leq v_{2b}$, the thickness of the planar plate 5 selected such that $t_a \leq t_b$. Thereby, the chromatic aberration is appropriately corrected according to the value of the Abbe number of the immersion liquid.

Further, according to Table 4, the sum of the thickness (t) of the planar plate 5 and the thickness (t') of the immersion liquid 2 is substantially constant in the range of 33.21 to 33.53, which is well within a practical range.

Figure 7:
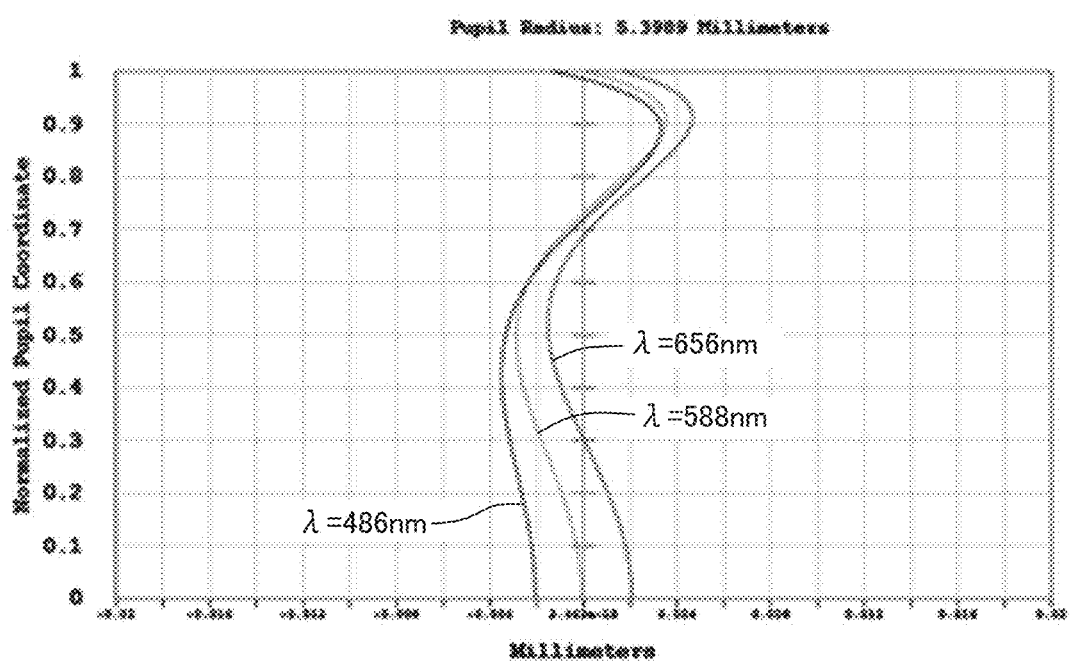
FIG. 7 is a longitudinal aberration diagram for immersion liquid 2-1.
Figure 8:
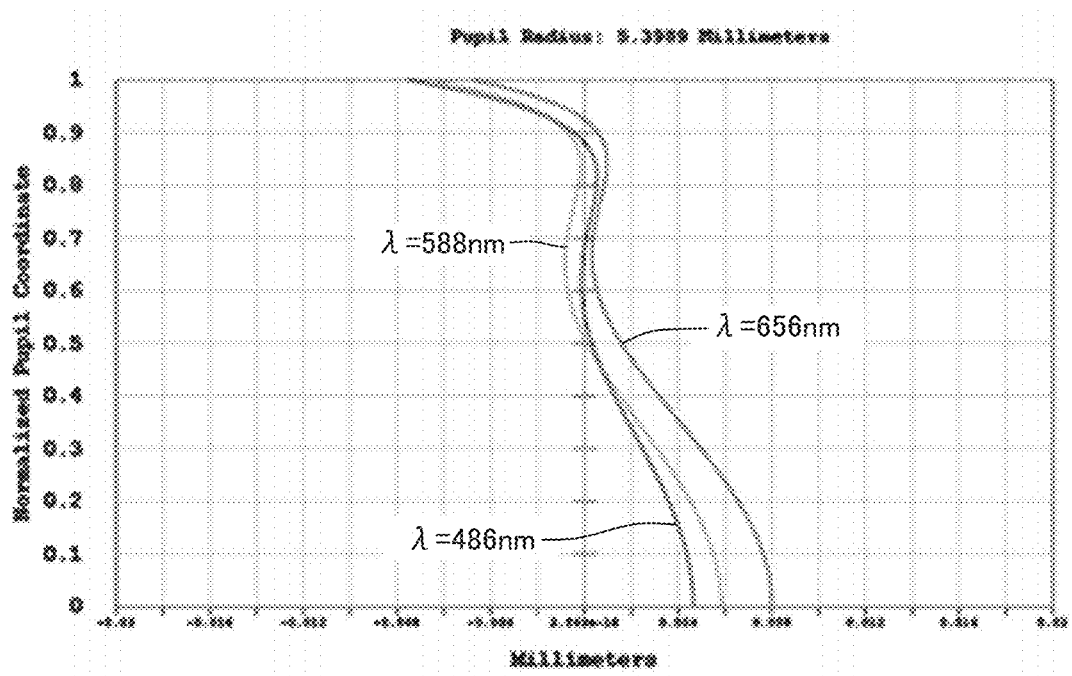
FIG. 8 is a longitudinal aberration diagram for immersion liquid 2-2.
Figure 9:
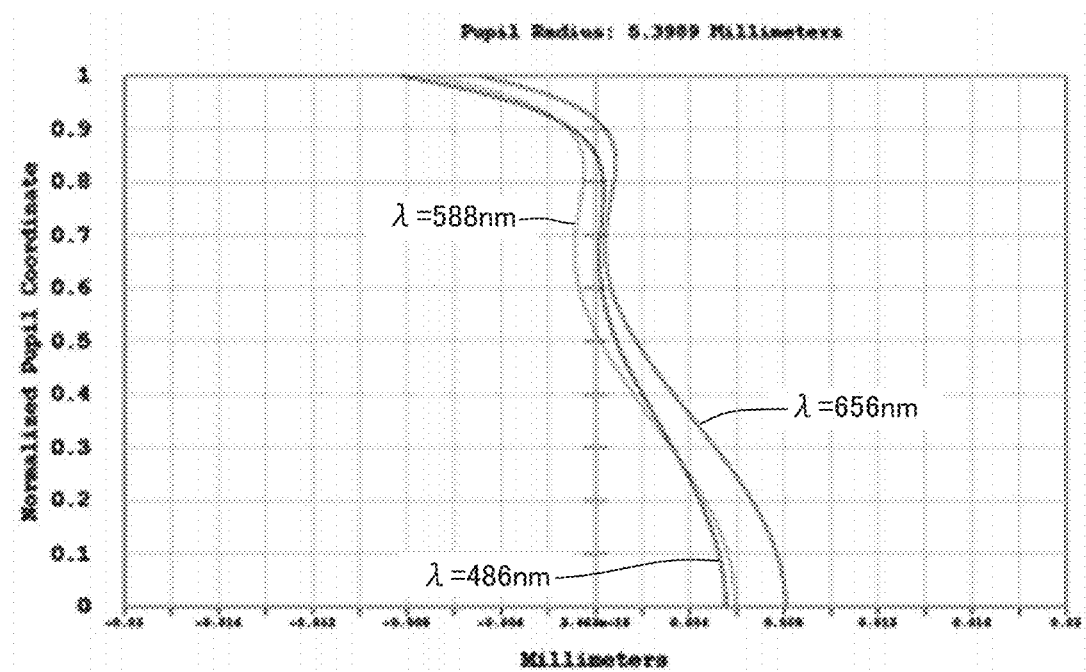
FIG. 9 is a longitudinal aberration diagram for immersion liquid 2-3.

FIGS. 7, 8 and 9 show spherical aberrations (longitudinal aberrations) at λ=656.27 nm (C line), 587.56 nm (d line) and 486.13 nm (F line) resulting from this design configuration. From these diagrams, it can be seen that this design configuration satisfies the achromatic conditions and maintains substantially constant chromatic aberration regardless of the selection of the medium $M_2$.

Figure 10:
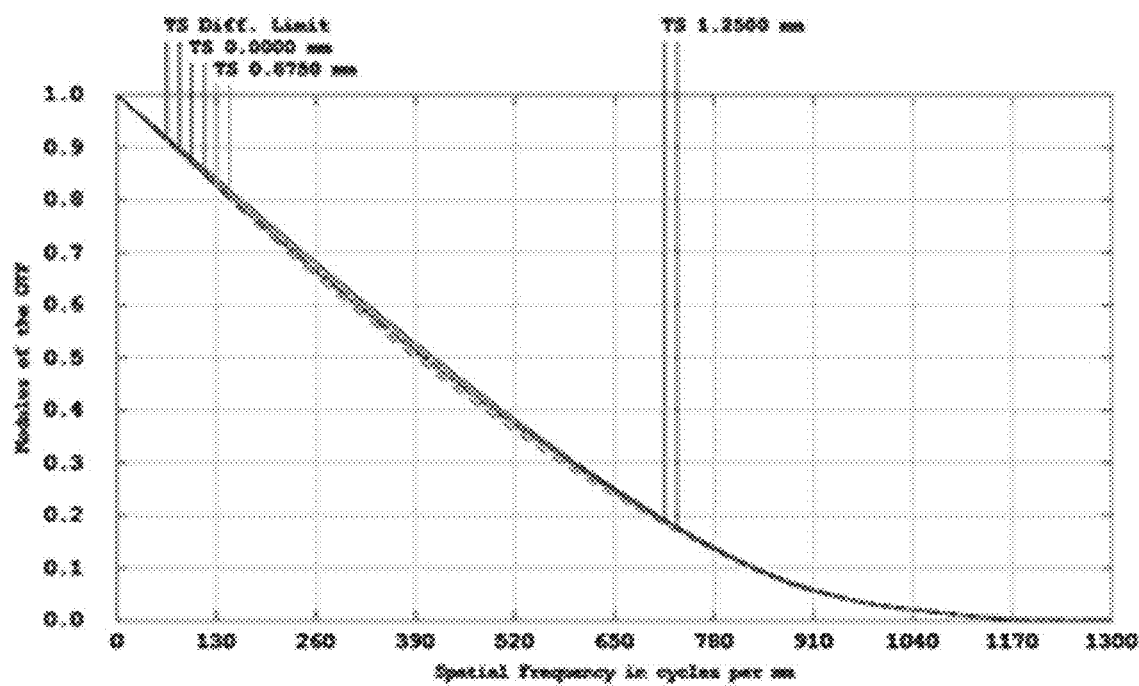
FIG. 10 is an MTF for immersion liquid 2-1.
Figure 11:
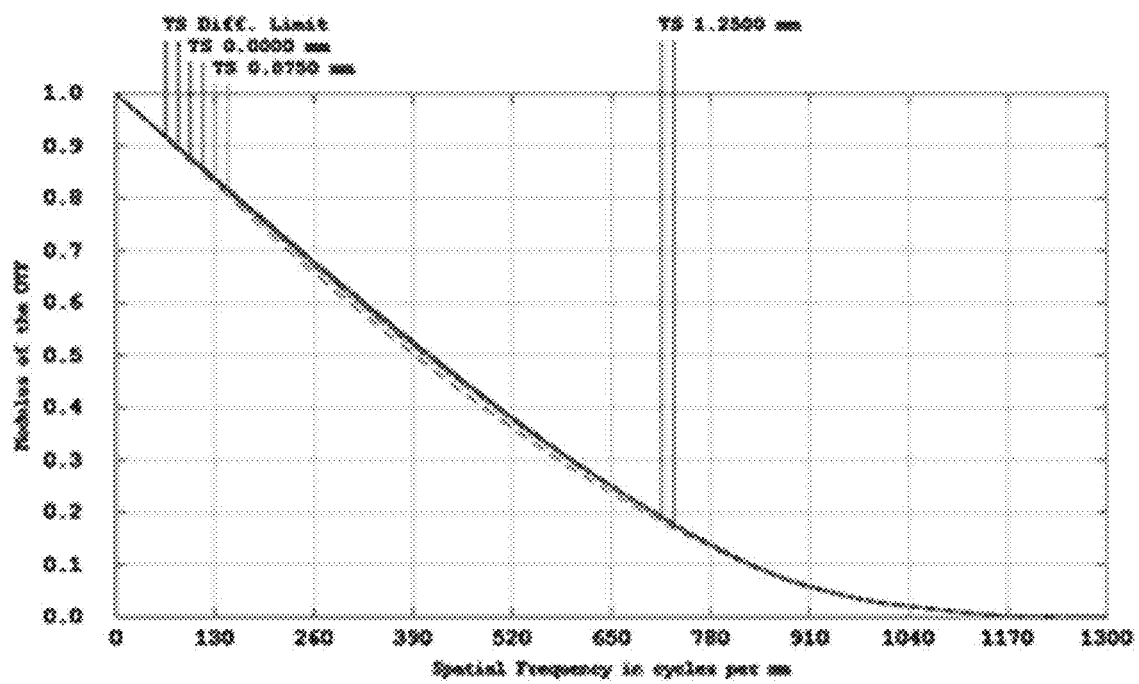
FIG. 11 is an MTF for immersion liquid 2-2.
Figure 12:
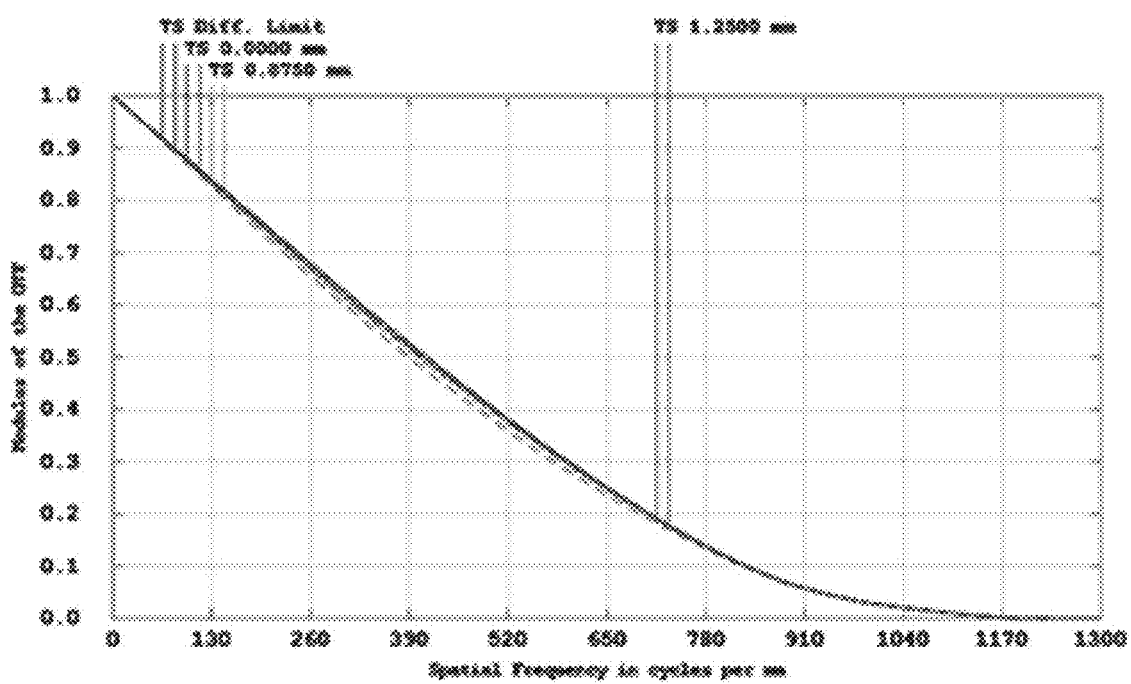
FIG. 12 is an MTF for immersion liquid 2-3.

Further, FIGS. 10, 11 and 12 show the Modulation Transfer Functions (MTF) at the above wavelengths, respectively. From these diagrams, it can be seen that the design configuration of the first embodiment provides an adequately high resolutions for all of the media M.

Second Embodiment 2

Figure 13:
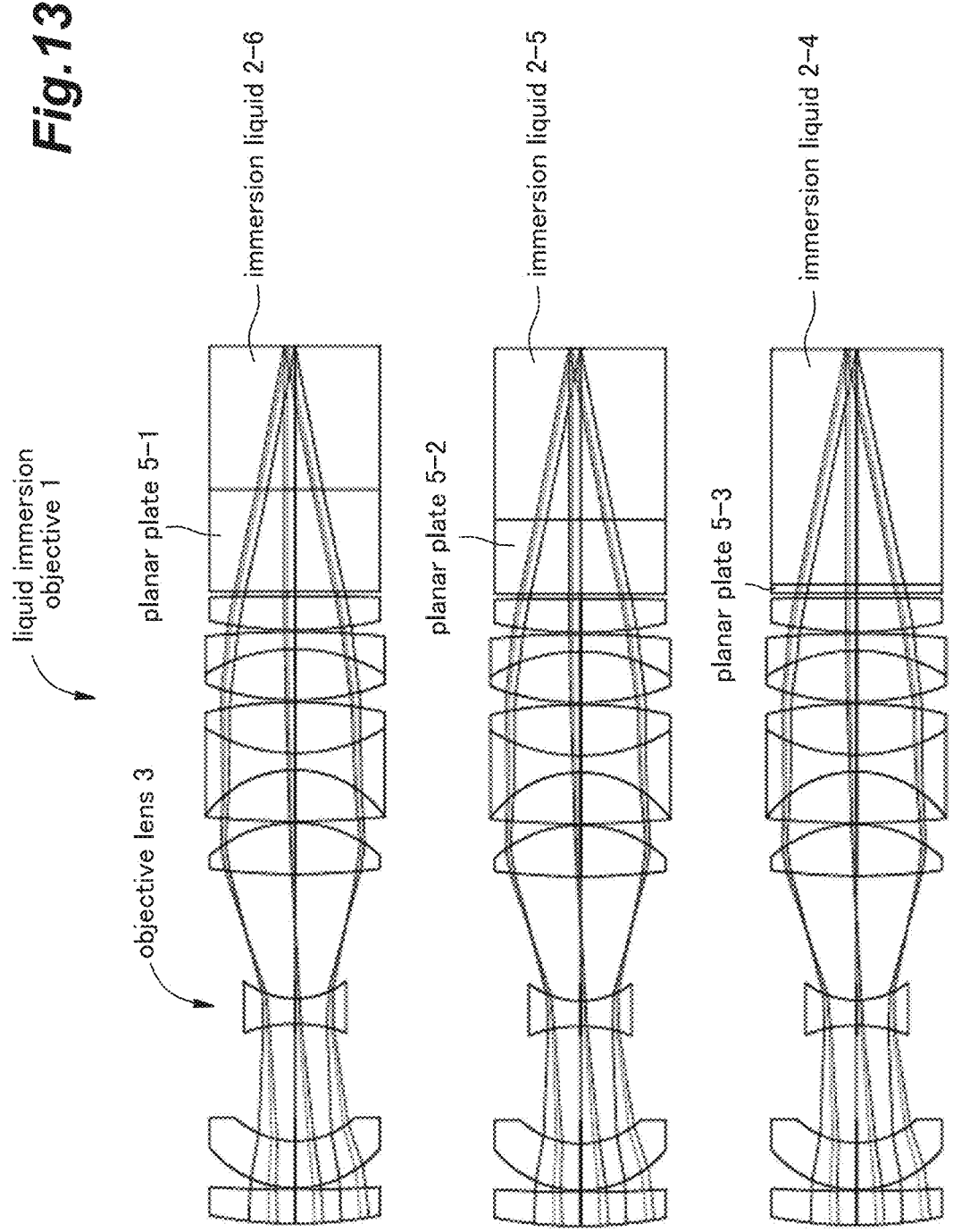
FIG. 13 is a diagram showing three different patterns of the light path in a microscope corresponding to immersion liquids 2-4, 2-5 and 2-6, respectively, according to a second embodiment of the present invention.

In the second embodiment, the immersion objective 1 has a focal length of 18 mm (f=18 mm), a numerical aperture of 0.3 (NA=0.3), a field of view of 2.5 mm (φ=2.5 mm). Further, the planar plates have an Abbe number $v_1$ which is greater than an Abbe number $v_2$ of any of the selected immersion liquids, and when the thickness $t_a$ of the planar plates is selected for the immersion liquid with an Abbe number $v_{2a}$, the thickness $t_b$ of the planar plates is selected for the immersion liquid with an Abbe number $v_{2b}$, and $v_{2a} \geq v_{2b}$, then $t_a \leq t_b$. The lens data is shown in Table 5, and the optical path diagram is shown in FIG. 13. Here, S-NBM51, S-BSL7, S-LAL18 and S-FPL55 are names of glass materials as named by of OHARA Corporation. CAF2 is fluorite.

TABLE 5

| surface number | radius of curvature [mm] | spacing [mm] | material | refractive index $n_d$ | Abbe number $v_d$ |
|---|---|---|---|---|---|
| 0 | Infinity | Infinity | air | | |
| 1 | Infinity | 47.494549 | air | | |
| 2 | Infinity | −47.494549 | air | | |
| 3 | 51.761732 | 4.000000 | S-NBM51 | 1.61340 | 44.27 |
| 4 | 152.716104 | 0.200000 | air | | |
| 5 | 12.969019 | 5.500000 | S-BSL7 | 1.51633 | 64.14 |
| 6 | 10.534908 | 13.702075 | air | | |
| 7 | −17.673147 | 3.000000 | CAF2 | 1.43384 | 95.00 |
| 8 | 9.856353 | 14.556918 | air | | |
| 9 | 77.457188 | 6.000000 | CAF2 | 1.43384 | 95.00 |
| 10 | −14.992620 | 0.200000 | air | | |
| 11 | 106.801765 | 6.000000 | CAF2 | 1.43384 | 95.00 |
| 12 | −12.962794 | 2.000000 | S-BSL7 | 1.51633 | 64.14 |
| 13 | 20.533237 | 6.000000 | CAF2 | 1.43384 | 95.00 |
| 14 | −44.996166 | 0.200000 | air | | |
| 15 | 29.919704 | 6.000000 | CAF2 | 1.43384 | 95.00 |
| 16 | −20.225265 | 2.000000 | S-BSL7 | 1.51633 | 64.14 |
| 17 | −104.020825 | 0.200000 | air | | |
| 18 | 46.318669 | 4.000000 | S-LAL18 | 1.72916 | 54.68 |
| 19 | −402.597992 | 0.500000 | air | | |
| 20 | Infinity | * | S-FPL55 (planar plate) | 1.43875 | 94.66 |
| 21 | Infinity | * | medium $M_2$ | * | * |
| 22 | Infinity | 0.000000 | | | |

Here, surfaces 20 and 21 correspond to the planar plate 5 and the immersion liquid 2, respectively. Table 6 shows the data on surfaces 20 and 21 of the medium M2 when the immersion liquids 2-4, 2-5, and 2-6 have the characteristics shown in Table 6 given below.

TABLE 6

| | immersion liquid 2-4 | immersion liquid 2-5 | immersion liquid 2-6 |
|---|---|---|---|
| thickness of planar plate(t1) [mm] (surface 20) | 1.000000 | 8.738823 | 11.990299 |
| refractive index of medium $M_2$ | 1.500000 | 1.540000 | 1.560000 |
| Abbe number of medium $M_2$ ($v_2$) | 34.502541 | 28.441650 | 25.183608 |
| thickness of medium $M_2$ ($t_2 = t'$) [mm] (surface 21) | 27.645142 | 20.102235 | 16.837077 |
| $t_1 + t_2$ (=t + t') [mm] | 28.645142 | 28.841058 | 28.827376 |

Here, the material of the planar plate 5 is S-FPL55. The refractive index of this glass material with respect to the d-line is 1.439948, the Abbe number is 94.6 which is greater than the Abbe number of any of the immersion liquids 2-4, 2-5, and 2-6 selected as the medium $M_2$. Moreover, according to Table 6, the thickness of the planar plate 5 get greater as the Abbe number of the immersion liquid 2 decreases. In other words, the Abbe number of the planar plate 5 is greater than the Abbe number of the immersion liquid 2. Moreover, when the thickness of the planar plate 5 selected for the immersion liquid 2 having the Abbe number of $v_{2a}$ is $t_a$, the thickness of the planar plate 5 selected for the immersion liquid 2 having the Abbe number of $v_{2b}$ is $t_b$, and $v_{2a} \geq v_{2b}$, the thickness of the planar plate 5 selected such that $t_a \leq t_b$. Thereby, the chromatic aberration is appropriately corrected according to the value of the Abbe number of the immersion liquid.

Further, according to Table 6, the sum of the thickness (t) of the planar plate 5 and the thickness (t') of the immersion liquid 2 is substantially constant in the range of 28.64 to 28.84, which is well within a practical range.

Figure 14:
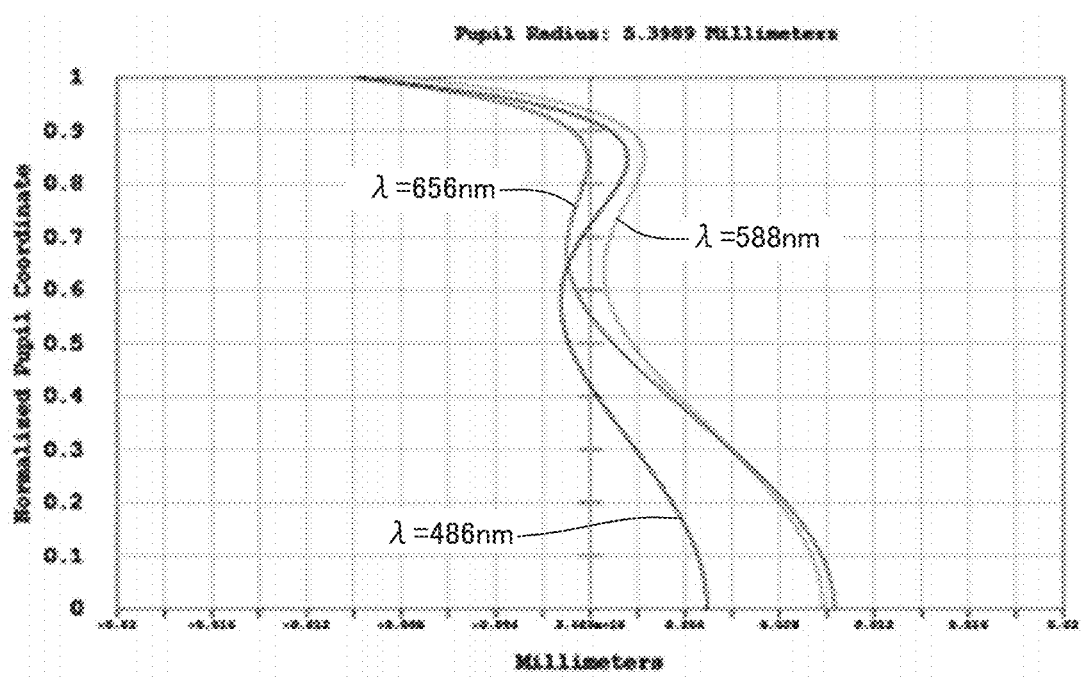
FIG. 14 is a longitudinal aberration diagram for immersion liquid 2-4.
Figure 15:
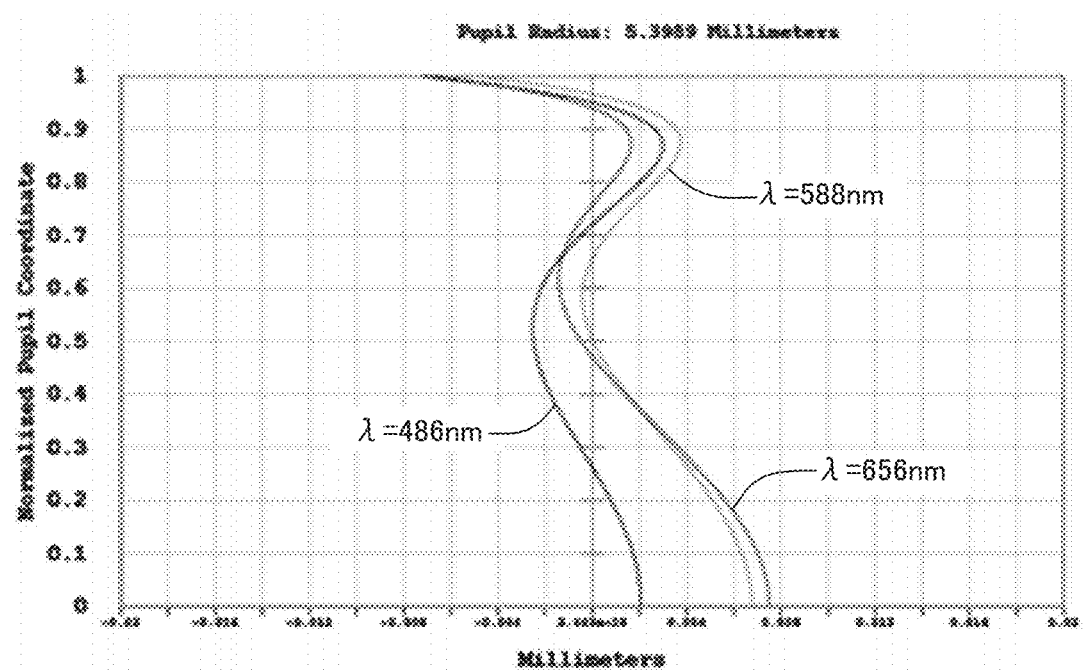
FIG. 15 is a longitudinal aberration diagram for immersion liquid 2-5.
Figure 16:
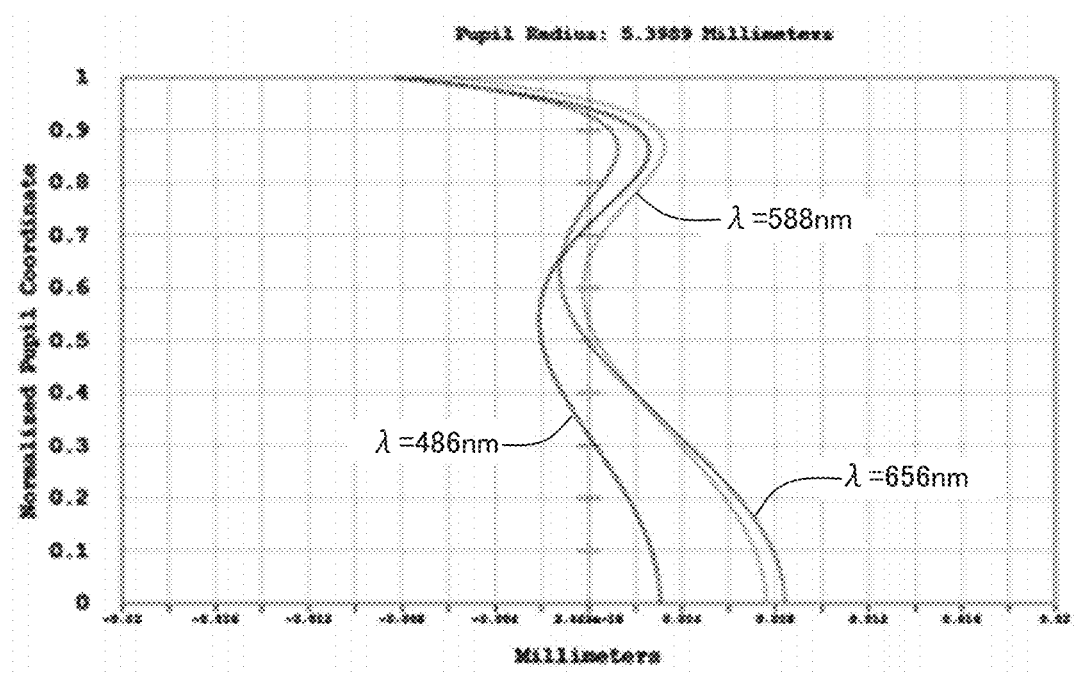
FIG. 16 is a longitudinal aberration diagram for immersion liquid 2-6.

FIGS. 14, 15 and 16 show spherical aberrations (longitudinal aberrations) at =656.27 nm (C line), 587.56 nm (d line) and 486.13 nm (F line) resulting from this design configuration. From these diagrams, it can be seen that this design configuration satisfies the achromatic conditions and maintains substantially constant chromatic aberration regardless of the selection of the medium M2.

Figure 17:
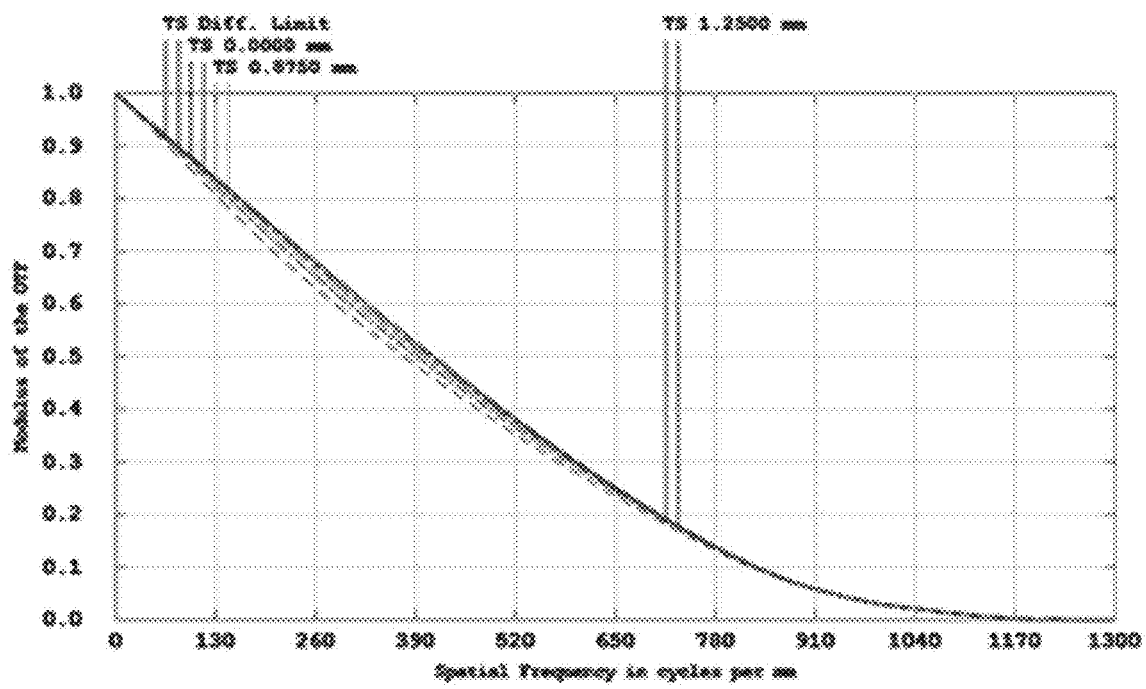
FIG. 17 is an MTF for immersion liquid 2-4.
Figure 18:
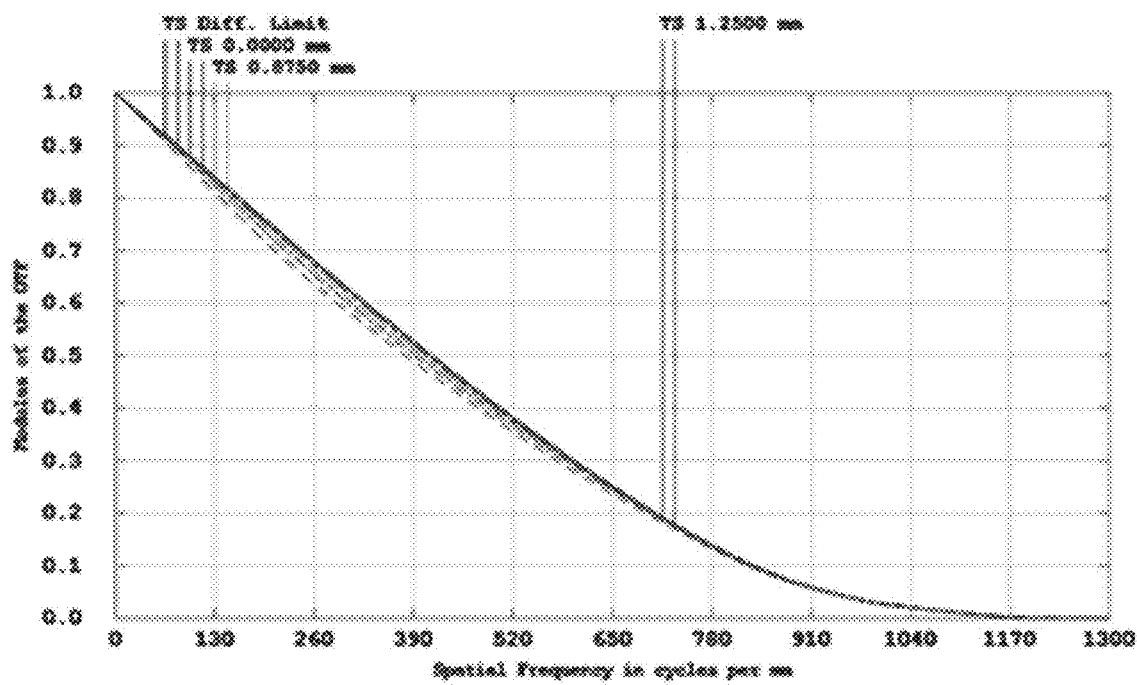
FIG. 18 is an MTF for immersion liquid 2-5.
Figure 19:
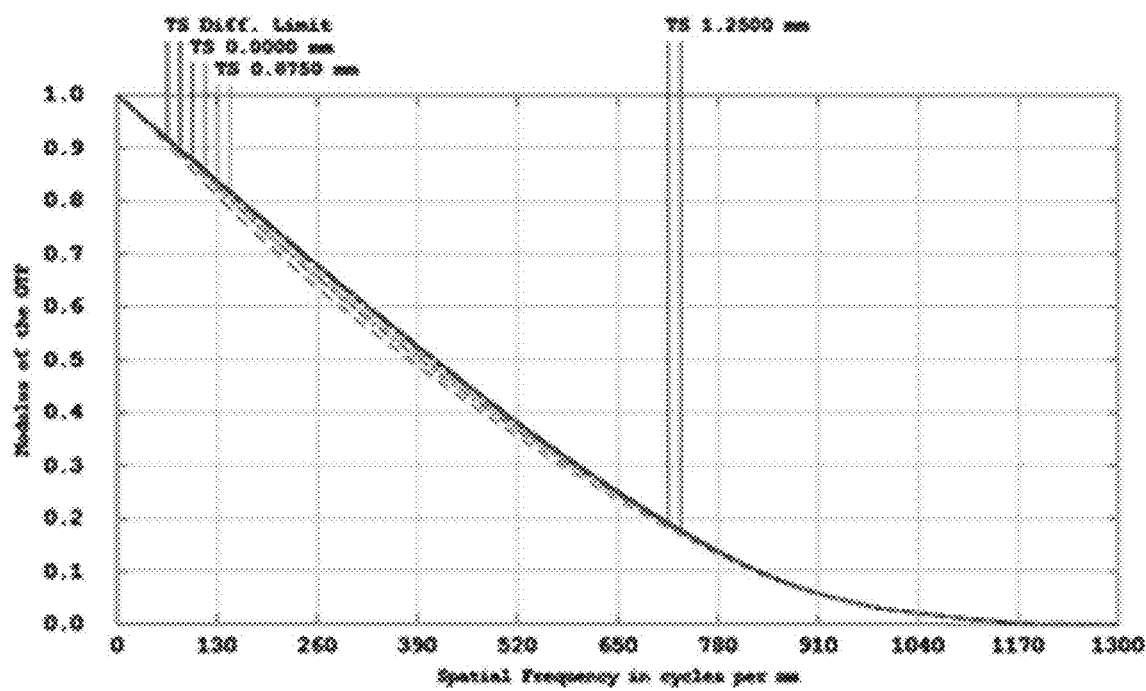
FIG. 19 is an MTF for immersion liquid 2-6.

Further, FIGS. 17, 18 and 19 show the Modulation Transfer Functions (MTF) at the above wavelengths, respectively. From these diagrams, it can be seen that the design configuration of the second embodiment provides an adequately high resolutions for all of the media M.

Figure 20:
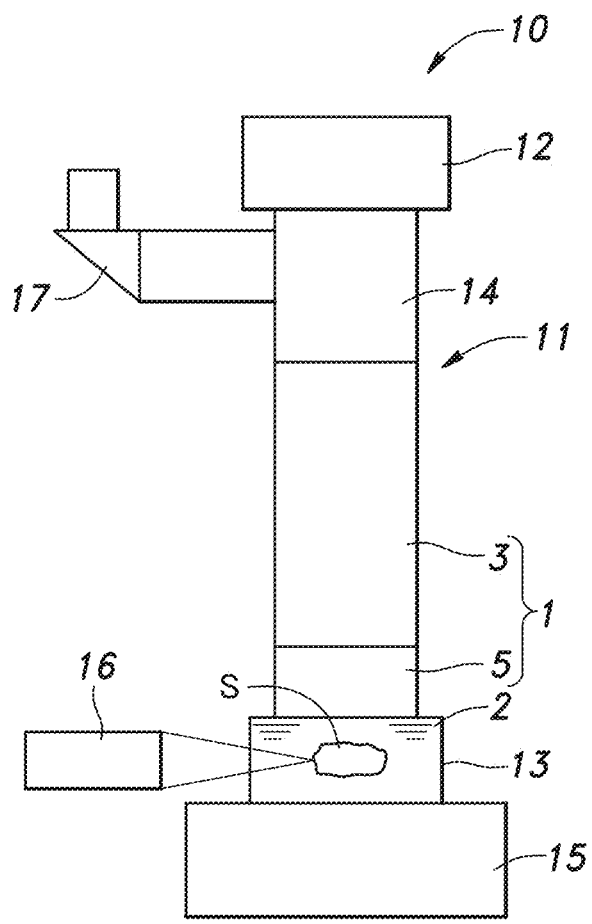
FIG. 20 is a schematic view showing an overall structure of a microscope using a liquid immersion objective according to an embodiment of the present invention.

Next, a microscope 10 to which the immersion objective 1 according to the present invention is applied is described in the following with reference to FIG. 20. As shown in FIG. 20, the microscope 10 includes an imaging optical system 11 for acquiring a microscopic image of a sample S, and an imaging device 12 for capturing the microscopic image. The imaging device 12 consists of a digital camera which converts incident light into an electric signal to generate image data, and processes the generated image data into a useful form. The image data processed by the imaging device 12 is forwarded to a computer (not shown in the drawings), and is displayed on a display as a microscopic image of the sample S by the computer.

The imaging optical system 11 includes an immersion liquid chamber 13, an objective lens 3 having the above described configuration, and an imaging lens 14, in this order from the sample S side. The immersion liquid chamber 13 is filled with the immersion liquid 2 so as to be in contact with the surface of the objective lens 3 on the sample side. The objective lens 3 is an infinity corrected microscopic objective lens configured to be used in combination with the imaging lens 14. The imaging lens 14 has a positive refractive power, and converges the flux of infinite distance light rays emitted from the objective lens 3 to form an optical image of the sample S on the imaging surface of the imaging device 12. The imaging lens 14 may be composed of a single lens (a single lens or a bonded lens), or may be composed of a plurality of lenses.

The planar plate 5 is configured to be selectively placed between the objective lens 3 and the immersion liquid 2 so as to be in contact with the immersion liquid 2 filled in the immersion liquid chamber 13. The immersion objective 1 consists of the objective lens 3 and the planar plate 5. Thus, the planar plate 5 (planar plates 5) arranged between the objective lens 3 and the immersion liquid 2 can be changed for each different type of immersion liquid 2 having a particular Abbe number.

The microscope 10 further includes an XYZ stage 15 on which a sample S may be placed, a first illuminating device 16, and a second illuminating device 17. The XYZ stage 15 is configured to move the sample S in three axial directions including the optical axis of the imaging optical system 11 and two axes orthogonal to the optical axis and to each other. The XYZ stage 15 may be an electric stage or a manual stage. The sample S is immersed in the immersion liquid 2 filled in the immersion liquid chamber 13, and the sample S can be moved to any desired position in three dimensions by being placed on the XYZ stage 15.

In the present embodiment, the sample S can be illuminated in two different ways; the first illuminating device 16 may illuminate the sample S from outside of the immersion liquid chamber 13, and the second illuminating device 17 may illuminate the sample S via the objective lens 3 (epi-illumination). It is also possible to form a hole in the center of the XYZ stage 15, and illuminate the sample S through this hole (transmissive illumination)

The illumination light scattered by the sample S or the fluorescent light generated by the sample S due to the excitation by the illumination light is captured by the objective lens 3, and the image is acquired by the imaging device 12 via the imaging lens 14, so that the microscopic image of the sample S is obtained. Furthermore, by moving the sample S by using the XYZ stage 15, three-dimensional information of a large sample S can be acquired over a wide range.

The sample S was moved while the microscope 10 is kept fixed in the above configuration, but, alternatively, the microscope 10 can be moved while the sample S is kept fixed without departing from the scope of the present invention.

It is expected that a plurality of types of immersion liquid 2 are used for the immersion liquid 2 to deal with various different situations. When a different immersion liquid is used, the chromatic aberration inherent to the objective lens 3 changes due to the difference in the dispersion (Abbe number) of the immersion liquid 2. Therefore, according to the methods described in conjunction with the first embodiment and the second embodiment, a planar plate 6, having a thickness corresponding to the Abbe number ($v_2$) of the immersion liquid 2 and the Abbe number ($v_1$) of the planar plate 5, is placed between the objective lens 3 and the immersion liquid 2 so that the sample S can be observed with the chromatic aberration properly corrected according to the dispersion of the immersion liquid 2. Thus, a microscope 10 capable of correcting chromatic aberration for a plurality of different types of immersion liquids 2 can be provided by using a highly simple structure.

The present invention has been described in terms of specific embodiments, but is not limited by such embodiments, and can be modified in various different ways without departing from the scope of the present invention.

The present invention thus provides an objective 1 for a microscope that allows biological samples to be observed in a favorable manner, and can readily adapt to a wide range of immersion liquids 2 for an optimum resolution power.

The invention claimed is:

1. A liquid immersion objective, comprising:
an objective lens having a prescribed optical power; and
a plurality of planar plates having substantially no optical power and having different thicknesses, and configured to be placed between the objective lens and immersion liquid deposited on a sample to be observed, the planar plates being made of a substantially same material,
wherein the planar plates are selected according to a property of the immersion liquid.

2. A microscope, comprising:
the liquid immersion objective as defined in claim 1; and
an imaging lens that converges a light flux transmitted from the liquid immersion objective,
wherein the planar plates are configured to be selectively placed between the liquid immersion and the objective lens according to an Abbe number (v) of the immersion liquid, the Abbe number being a material specific value given by the following equation:

$$V = \frac{n_0 - 1}{n_S - n_L} \quad (1)$$

where $n_0$ is a refractive index of the planar plates at a mid point wavelength in a correction range of chromatic aberration, and $n_S$ and $n_L$ are refractive indexes of the planar plates on a short wavelength side and on a long wavelength side, respectively.

3. A method for observing a sample by using the microscope as defined in claim 2, comprising:
selecting at least one of the planar plates according to the Abbe number of the immersion liquid, and
placing the selected at least one of the planar plates between the objective lens and the immersion liquid.

4. The method for observing a sample according to claim 3, wherein the planar plates have an Abbe number $v_1$ which is smaller than an Abbe number $v_2$ of the immersion liquid, and when a thickness $t_a$ of the planar plates is selected for the immersion liquid with an Abbe number $v_{2a}$, a thickness $t_b$ of the planar plates is selected for the immersion liquid with an Abbe number $v_{2b}$, and $v_{2a} \leq v_{2b}$, then $t_a \leq t_b$.

5. The method for observing a sample according to claim 3, wherein the planar plates have an Abbe number $v_1$ which is greater than an Abbe number $v_2$ of the immersion liquid, and when a thickness $t_a$ of the planar plates is selected for the immersion liquid with an Abbe number $v_{2a}$, a thickness $t_b$ of the planar plates is selected for the immersion liquid with an Abbe number $v_{2b}$, and $v_{2a} \geq v_{2b}$, then $t_a \leq t_b$.

* * * * *